Figure 1:
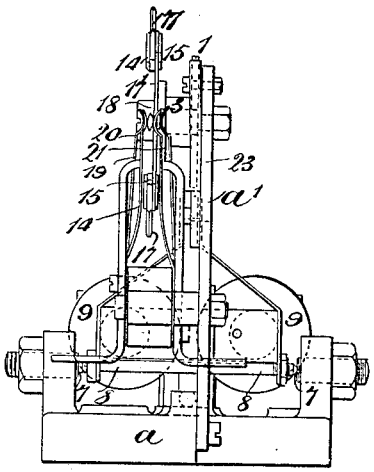

A. W. GATTIE & H. A. COX.
MEANS FOR CORRELATING A DESIRED OPERATION IN A TRAVELING CARRIAGE WITH THE DISTANCE TRAVELED, AND FOR TRANSMITTING ADJUSTMENTS BETWEEN TRAVELING INSTRUMENTS.
APPLICATION FILED JUNE 22, 1911.

1,085,409.

Patented Jan. 27, 1914.

9 SHEETS—SHEET 1.

Witnesses:

Inventors:
Alfred Warwick Gattie,
Henry Ashley Cox
By their Attorney

A. W. GATTIE & H. A. COX.
MEANS FOR CORRELATING A DESIRED OPERATION IN A TRAVELING CARRIAGE WITH THE DISTANCE TRAVELED, AND FOR TRANSMITTING ADJUSTMENTS BETWEEN TRAVELING INSTRUMENTS.
APPLICATION FILED JUNE 22, 1911.

1,085,409.

Patented Jan. 27, 1914.

9 SHEETS—SHEET 2.

Witnesses:

Inventors:
Alfred Warwick Gattie,
Henry Ashley Cox,
By their Attorney,

A. W. GATTIE & H. A. COX.
MEANS FOR CORRELATING A DESIRED OPERATION IN A TRAVELING CARRIAGE WITH THE DISTANCE TRAVELED, AND FOR TRANSMITTING ADJUSTMENTS BETWEEN TRAVELING INSTRUMENTS.
APPLICATION FILED JUNE 22, 1911.

1,085,409.

Patented Jan. 27, 1914.

9 SHEETS—SHEET 3.

Witnesses:

Inventors:
Alfred Warwick Gattie
Henry Ashley Cox,
By their Attorney,

A. W. GATTIE & H. A. COX.
MEANS FOR CORRELATING A DESIRED OPERATION IN A TRAVELING CARRIAGE WITH THE DISTANCE TRAVELED, AND FOR TRANSMITTING ADJUSTMENTS BETWEEN TRAVELING INSTRUMENTS.
APPLICATION FILED JUNE 22, 1911.

1,085,409.

Patented Jan. 27, 1914.

9 SHEETS—SHEET 5.

Witnesses:

Inventors:
Alfred Warwick Gattie,
Henry Ashley Cox,
By their Attorney, F. H. Richards

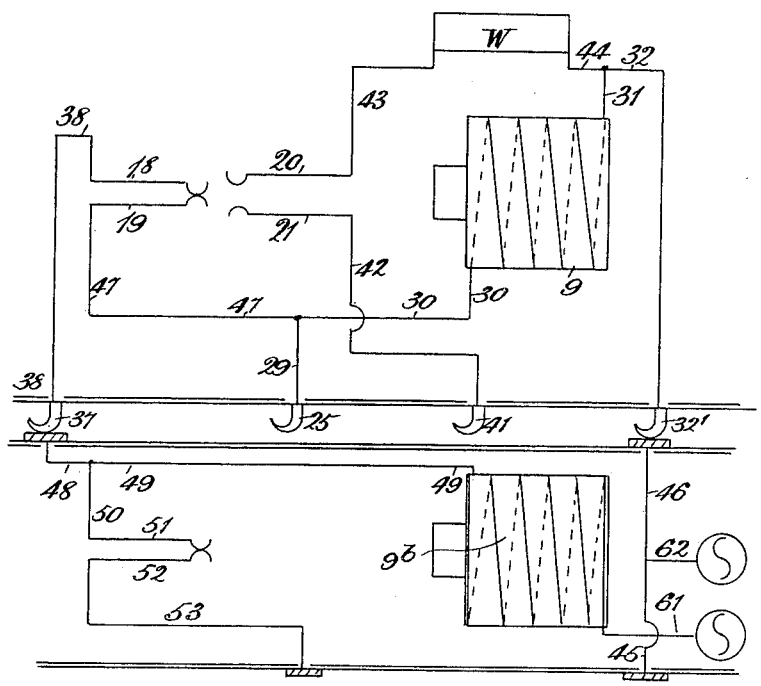

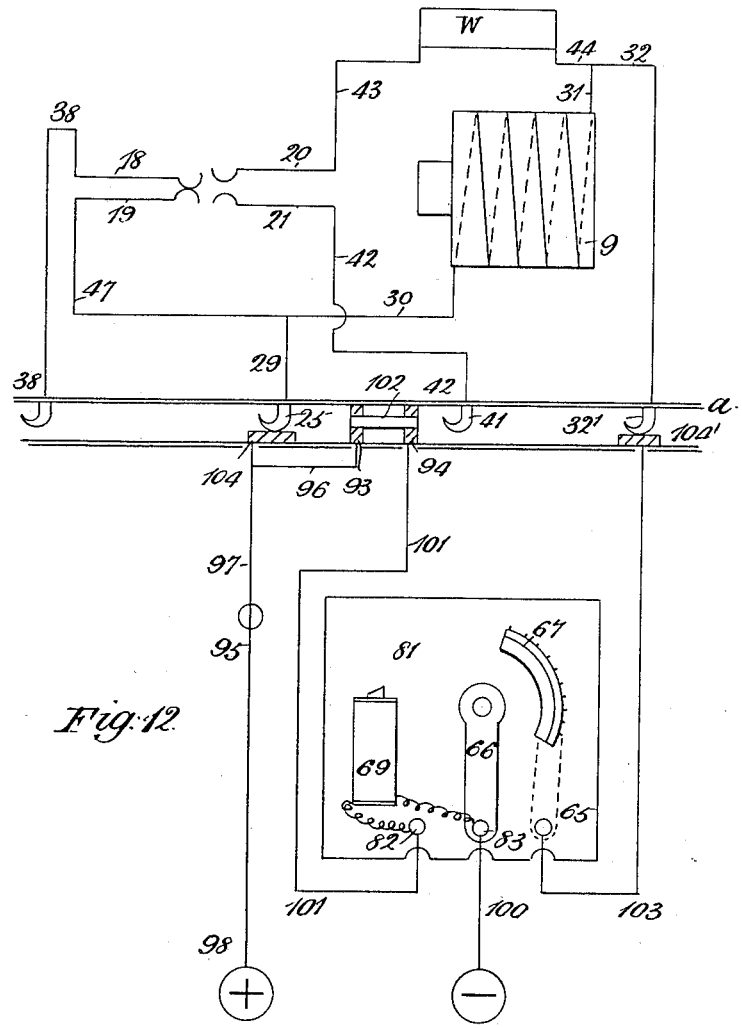

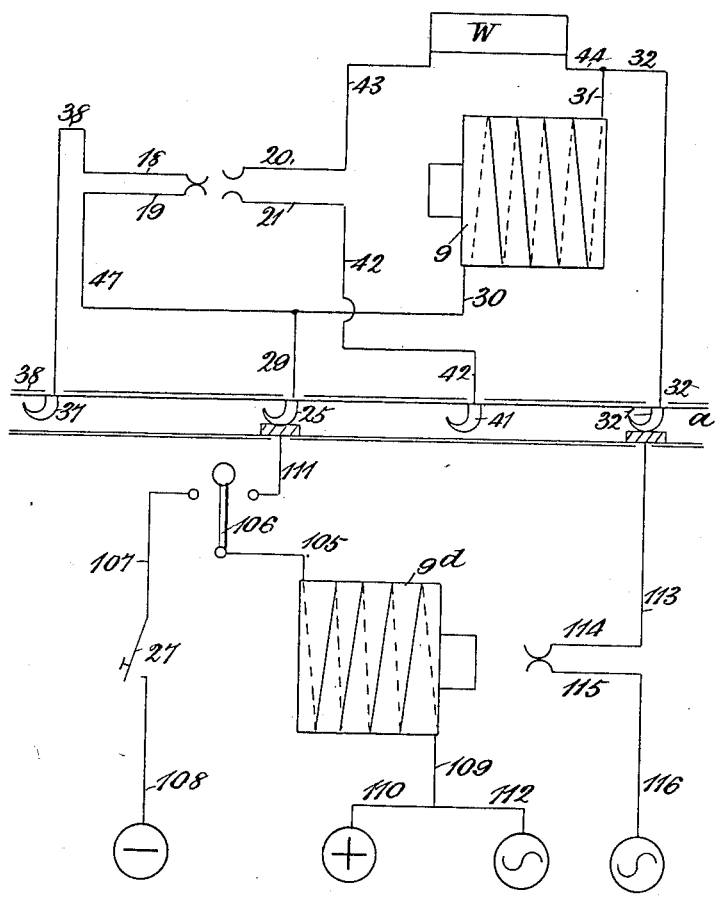

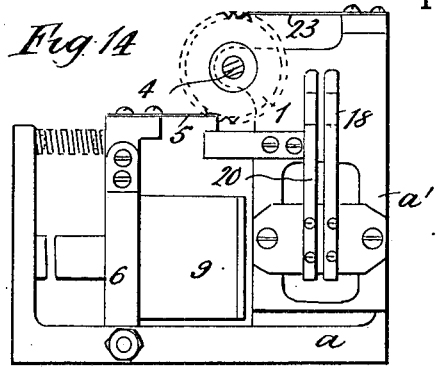
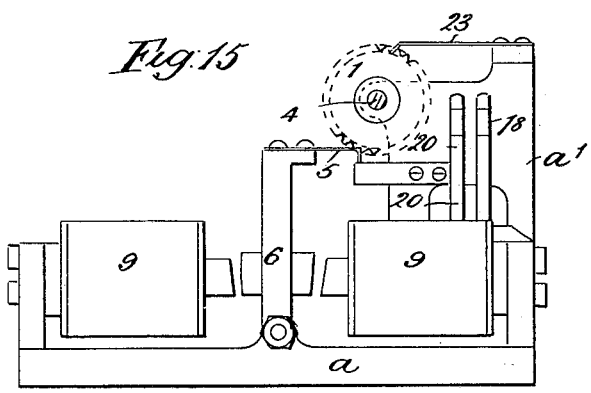
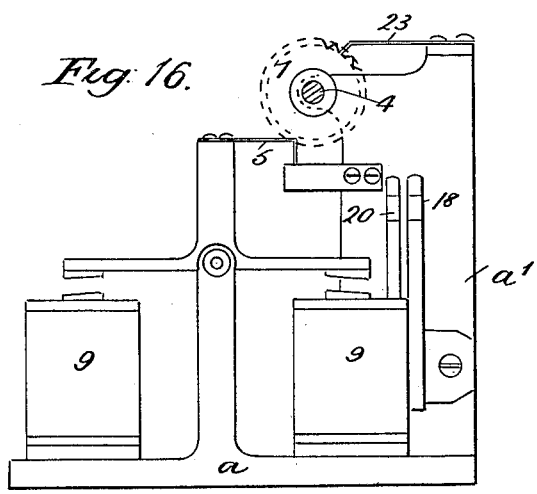

UNITED STATES PATENT OFFICE.

ALFRED WARWICK GATTIE AND HENRY ASHLEY COX, OF LONDON, ENGLAND.

MEANS FOR CORRELATING A DESIRED OPERATION IN A TRAVELING CARRIAGE WITH THE DISTANCE TRAVELED, AND FOR TRANSMITTING ADJUSTMENTS BETWEEN TRAVELING INSTRUMENTS.

1,085,409.  Specification of Letters Patent.  Patented Jan. 27, 1914.

Application filed June 22, 1911. Serial No. 634,842.

*To all whom it may concern:*

Be it known that we, ALFRED WARWICK GATTIE and HENRY ASHLEY COX, subjects of the King of Great Britain, residing in London, England, have invented certain new and useful improvements in means for correlating a desired operation in a traveling carriage with the distance traveled, and for transmitting adjustments between traveling instruments, of which the following is a specification.

This invention relates to improvements in means for effecting the automatic transfer of goods between two moving vehicles or between a stationary or fixed body and a moving vehicle, and which comprises means whereby an operator by setting or manipulating certain stationary means is enabled to impart a desired displacement, or setting, to means carried on any moving carriage in order that such displacement, or setting may be supplemented by reason of the moving carriage having passed a certain number of transferring points and the transfer of goods be then performed in consequence, in the means described in the United States Patent No. 1,022,935.

The present invention when applied to the type of carriage termed trucker in the said specification, has for its object to provide an improved form of controller for affecting the delivery or discharge of the trays from the trucker to the bays or from one trucker to another.

According to the present invention, the moving carriage upon which the desired operation is to take place is provided with a mechanism, hereinafter called a controller, which is essentially constituted as follows:— a ratchet sliding in a definite path, or revolving around an axis, a reciprocating pawl engaging the ratchet teeth and capable of driving it tooth by tooth in one direction, an electro-magnet and armature, one fixed and the other attached to the pawl, a spring acting either in the said direction or contrary to it, and suitable strips, wipers, and connections enabling electric current to be sent through the electromagnet, either from a stationary circuit opened and closed by the operator at will as the carriage passes a certain place, or from a similar apparatus set by the operator at any time previous, in which case alternating or intermittent current is employed.

The desired operation may be effected in consequence of the ratchet having reached a certain position, hereinafter termed the zero point, in any convenient manner. Thus the ratchet may mechanically trip a latch, or cause two parts to engage, but we usually prefer to reduce the effort called for, by causing the ratchet to merely close an electric circuit and so allow a current to effect the desired operation in any convenient manner.

In order that our said invention may be the better understood, we append hereunto eight sheets of drawings.

Figure 2:
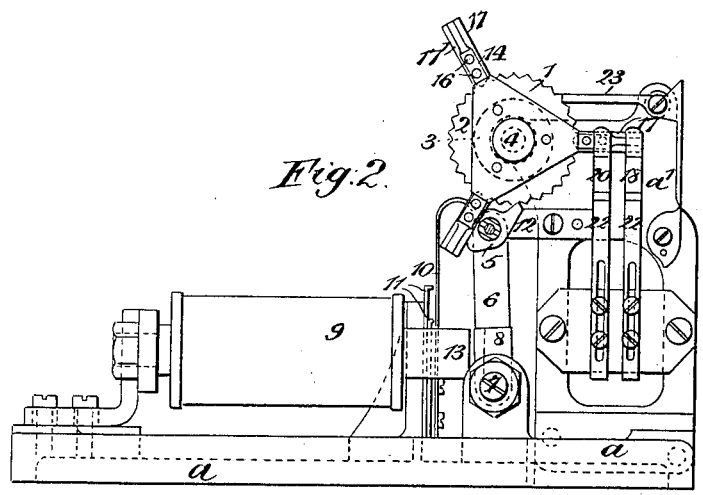
Figure 3:
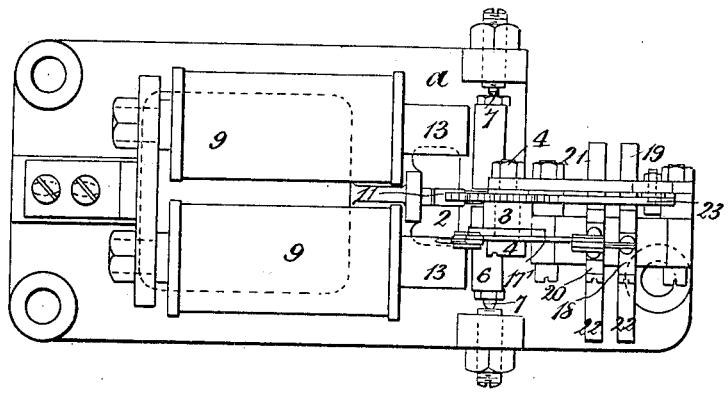
Figure 4:
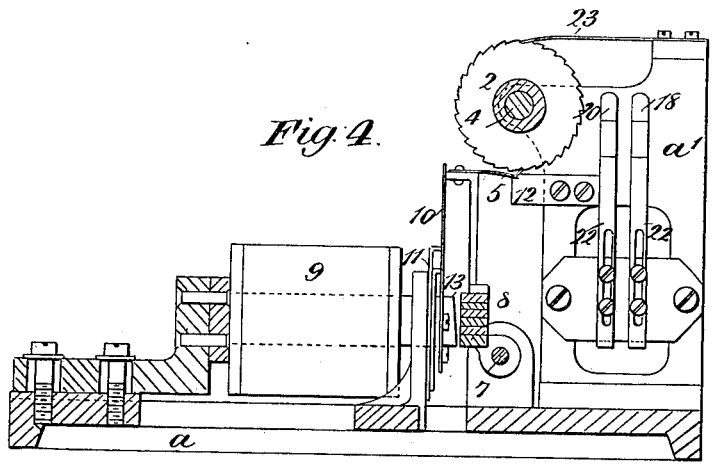
Figure 5:
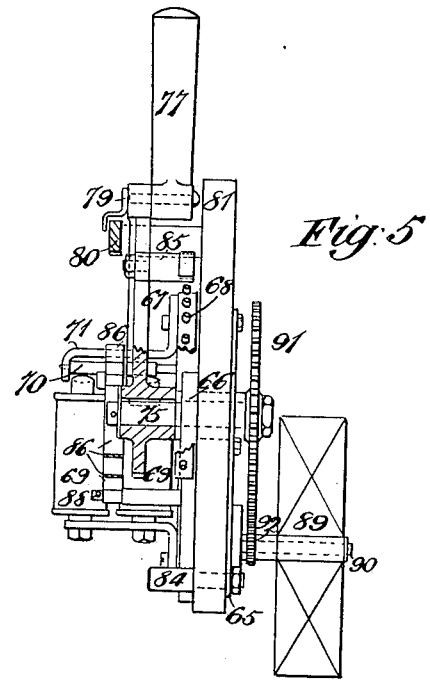
Figure 11:
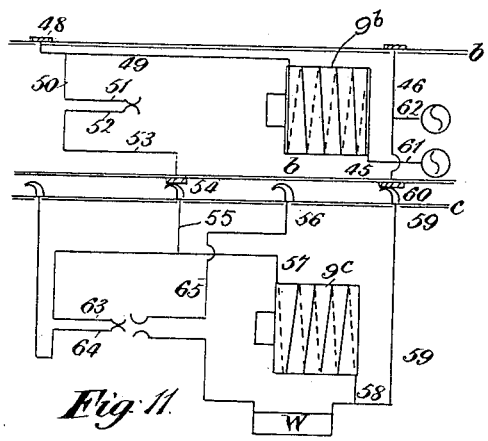
Figure 6:
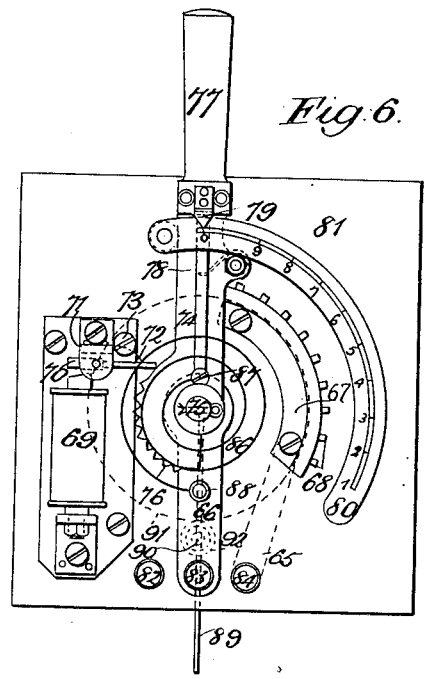
Figure 7:
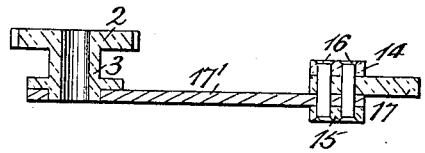
Figure 8:
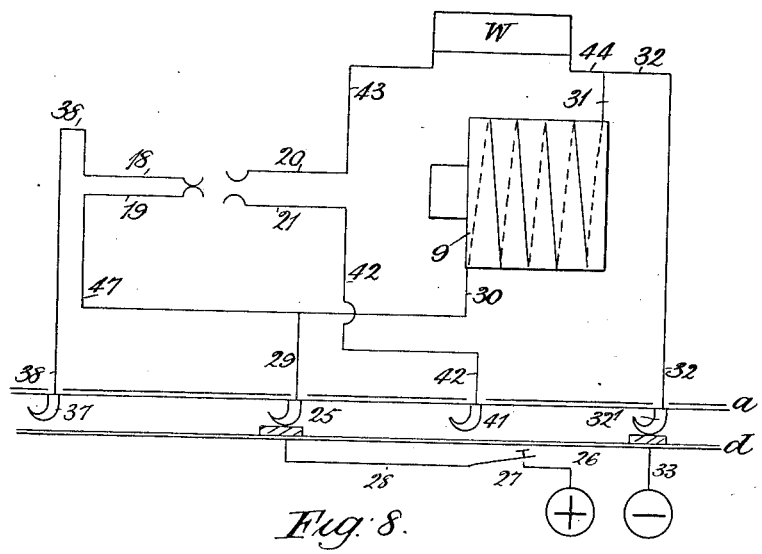
Figure 9:
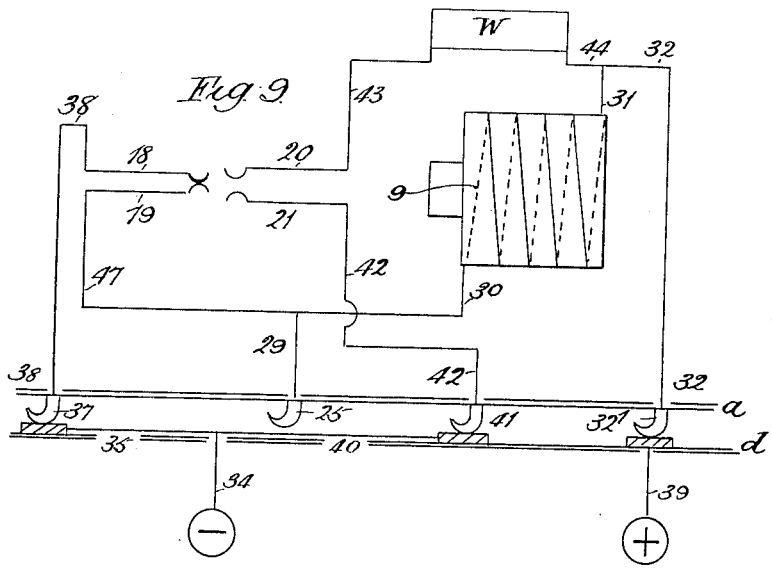

Figure 1. is an end elevation of one form of apparatus in accordance with the present invention. Fig. 2. is a side elevation of the apparatus as usually made. Fig. 3. is a plan of the apparatus as usually made. Fig. 4. shows an alternative manner of making the pawls of the controller. Figs. 5 and 6 show a form of apparatus which can be set by the operator at any time previous to the arrival of the traveling carriage at his strips, and by which the controller on the traveling carriage will then be set. Fig. 7. is a sectional plan showing a manner of connecting the conductors upon the controller. Fig. 8. is a diagram of the electrical connections showing the controller on the traveling carriage being set at the operator's strips. Fig. 9. is a diagram showing the manner in which the setting of the traveling controller is supplemented in passing the measuring stations. Fig. 10. is a diagram showing the manner in which the traveling controller aforesaid sets a similar controller carried on a second traveling carriage. Fig. 11. is a diagram showing the manner in which the controller on the second traveling carriage sets the controller on a third traveling carriage. Fig. 12. is a diagram of connections for the apparatus shown in Figs. 5 and 6. Fig. 13. is a diagram showing the arrangement employed when the operator sets a stationary apparatus, similar to the traveling controller, and causes the stationary apparatus to set the traveling controller by means of alternating or intermittent current. Fig. 14 is a side elevation showing an alternative arrangement of the electro-magnet ratchet gear in which the electro-magnet is movable. Fig. 15 shows a further alternative in which the movement of the pawl carrying member is effected in both directions by means of electromagnets. Fig. 16 is a similar view showing an arrangement in which the pawl is operated by an arrangement of polarized electro-magnets and armatures.

Referring to the accompanying drawings, Figs. 1, 2 and 3, in which a controller is shown which consists of a ratchet 1 formed on the edge of a disk 2, which disk is mounted on a sleeve or hub 3 free to turn on a pin, or axle 4 mounted on the portion $a^1$ of the frame $a$. A reciprocating pawl 5 engages with the teeth of the said ratchet disk 2 and is capable of driving it tooth by tooth in one direction. The said pawl 5 is attached to a lever 6 pivotally mounted on the frame $a$ of the machine at 7. The said lever 6 carries the armature 8 for an electromagnet 9. A spring 10 presses against the said lever 6, and we prefer to provide some means, such as the adjustable stops 11 for regulating the strength of the said spring. A fixed stop 12 is provided for limiting the travel of the said pawl 5 in one direction, and a stop for the same purpose at the other end of the said pawl's travel may conveniently be provided by the poles 13 of the electromagnet 9 acting against the said armature 8, or by pieces of non-magnetic material inserted in them, the travel of the said pawl being arranged to drive the said ratchet one tooth at a time.

The electromagnet 9 is of the usual form, having pole pieces 13 as aforesaid. The electromagnet is capable of being energized and deënergized at will by means of an electric current conveyed by suitable strips, wipers, and connections. The said magnet 9, the lever 6, and the pin, or axle, 4, are attached to the frame $a$ $a^1$ in the manner clearly shown in the figures. We do not, however, wish to confine ourselves to the particular methods shown, but to use any convenient means for fixing them whatever.

14 and 15 indicate electric conductors connected by means of the rivets 16 to insulating pieces or bodies 17 carried by arms $17^1$ attached to the said sleeve 3 and the ratchet 2 and rotating with them.

18 and 19, 20 and 21, indicate electric brushes, or contacts attached to the frame of the apparatus but insulated from it. The said brushes may conveniently be provided with means for adjusting their position with regard to each other, such for instance as by the pieces 22. The said brushes 18 and 19 are so arranged that they always tend to touch one another and thus allow an electric current to flow in the circuit of which they form part. They are separated, and the circuit broken, by means of the insulating piece 17 aforesaid when the instrument is in its neutral, or zero position. The brushes 20, 21 can never touch each other, but when the instrument is in its neutral position the conductors 14 and 15 and the rivets 16 aforesaid, form a bridge and allow a current to flow in the circuit of which they form part. A non-return pawl 23 is provided to prevent the ratchet disk 2 from turning backward.

The manner in which the controller is worked is as follows:—When the electromagnet 9 is energized by an electric current it attracts its armature 8 toward its pole pieces 13, the said armature being attached to the lever 6, the said lever 6 with the pawl 5 together move toward the said poles 13, causing the said pawl 5 to engage a fresh tooth in the ratchet 2. The lever 6 moving as aforesaid causes the spring 10 to be strained. On the energizing circuit of the magnet 9 being broken, the lever 6 is free to move back against the stop 12 under the action of the said spring 10. In moving back the pawl 5 drives the ratchet 2 by one tooth. The non-return pawl 23 then drops behind another tooth. The stop 12 may conveniently be formed in such a manner that when the pawl 5 bears against it, the disk 2 is securely locked and unable to rotate at all. Figs. 2 and 4 show 12 shaped to fulfil this condition. The moving carriage is also provided with means for effecting the transfer of the goods which means form no part of the present invention and is indicated generally by $w$ in Figs. 8, 9, 10, 11, 12 and 13.

In the case of the operator opening and closing the circuit as the carriage passes a certain place, strips and wipers are provided, as shown in Fig. 8, so as to then join the traveling magnet 9 with the fixed operator's circuit. Thus from one pole electric current flows through conductor 26, the operator's tapping key 27, conductor 28, wiper 25, conductors 29 and 30, the winding of the traveling magnet 9, conductors 31, 32 and 33, and the wiper $32^1$ to the other pole of the circuit.

The operator makes and breaks the circuit by any convenient means, such as the tapping key 27 above referred to, or the special switch shown in Figs. 5, 6 and 12, and by this means intermittently energizes the magnet 9 so that the pawl 5 is pulled to engage a fresh tooth in the ratchet and then allowed to shift the same under the action of the spring, as aforesaid, or the magnet may pull the pawl engaged with a tooth against the spring; the ratchet being advanced one tooth for each opening and closing of the circuit by the operator. The carriage now proceeds with its ratchet displaced, say T number of teeth, and the said ratchet is caused to effect the desired operation by reaching zero point as aforesaid, the carriage having traveled a certain distance, which distance is measured off in stations at each of which the ratchet is again advanced one tooth. The advance of the ratchet is effected by energizing the aforesaid electromagnet from a source of direct current at each station, the current being conveyed by wipers. Referring to Fig. 9, which shows particularly how this is effected, direct current is conveyed by the conductors 34 and 35, the strip and wiper 37, conductor 38, brush 18, brush 19, conductors 47 and 30, the winding of the magnet 9, conductors 31, 32 to the wiper $32^1$, and by the strip and conductor 39 to the source of supply. The magnet is deënergized by the said strips and wipers parting company and so breaking the circuit.

When the carriage has traveled the required distance the ratchet has been advanced by as many teeth as there are stations passed and in its final position the ratchet reaches zero point and the desired operation is effected. The manner in which it is effected is seen in Fig. 9. As aforesaid, in the zero position the brushes 20 and 21 are connected by means of the conductors 14, 15 and 16, (Figs. 1, 2, 3 and 7), thus a circuit is completed which energizes $w$ in any convenient manner: viz—from the source of supply by conductors 34 and 40, strip and the wiper 41, conductor 42, brush 21, conductors 14, 15 and 16 aforesaid, brush 20, conductor 43, the said means $w$, conductor 44, 32, wiper $32^1$, the strip and the conductor 39 to the source of supply. If there are T plus U teeth in the ratchet and the ratchet is advanced from zero T teeth by the operator, the zero point will be reached after passing U stations. For example, let there be ten teeth in the ratchet and let it be desired to effect the operation when seven stations have been passed by the carriage after the controller is set at the operator's strips. The ratchet starts ten teeth away from zero point, the operator will make and break his circuit three times while the controller magnet circuit is connected to his circuit by the strips and wipers. The magnet is energized and deënergized three times, and the ratchet is advanced three teeth, so, on being further advanced one tooth at each of the seven stations passed, it reaches zero point as desired.

The ratchet may be straight or circular and may be returned to starting point in any convenient manner after reaching zero point, but we usually prefer to make it in circular form and so that the zero point at which the desired operation is effected is also the starting point of the next setting. This is particularly shown in Figs. 1, 2, 3 and 4.

There is no limit to the number of teeth in the ratchet between the zero points, or to the number of stations passed, provided these do not exceed the number of teeth between the zero points. When the controller of a traveling carriage has reached its zero point its ratchet cannot be further advanced by the said measuring stations for this reason:—the ratchet having reached its zero point has caused the insulating piece 17 afore-mentioned to pass between and to separate the brushes 18 and 19, thus breaking exciting circuit of the magnet 9. Therefore the ratchet cannot again be moved until it is set afresh at the operator's strips. In larger installations it may be necessary to use several endless trains or carriages, each train serving a separate group of stations. Where goods are despatched from a station of one group to another group, it is necessary to change carriages. Under these conditions traveling controller may be the means of setting a second traveling controller, and this again may set a third, and so on, so that coincidentally with the transfer of the goods the controller on the receiving vehicle has imparted to it the required setting necessary to effect the delivery of said goods at the desired point.

We will now describe how the operator may give a setting to a controller on a carriage which does not come into direct electrical connection with his strips at all. Let him desire to make this carriage perform an operation when it has passed U stations from a point we will call $z$. A carriage "$a$" passes the strips of his circuit and he causes its ratchet to be advanced T teeth as already described, U teeth being still to be advanced to zero point. Now let this carriage, pass a second carriage "$b$" fitted with a similar controller, strips and wipers, and let the circuits of the two magnets be joined in series with a source of alternating or intermittent current. This is shown particularly in Fig. 10. The current is taken from an external source of supply by means of shoes contacting with conductor rails in the manner well known to those skilled in the art by conductors 62 and 46, the strip and the wiper $32^1$, conductors 32 and 31, the magnet winding, conductors 30 and 47, brushes 19 and 18, conductor 38, wiper 37, the strip, conductors 48 and 49, the winding of the magnet $9^v$, and by conductor 61 to the source of supply. The carriages are moving past each other and the connection is formed by the wipers $32^2$ and 37 rubbing along strips 104 and $104^1$ on the other carriage. It must be understood that whereas one controller is necessary for each vehicle on a single endless train; where there are several endless trains serving groups of stations, as described in the aforementioned Patent No. 1022935, each carriage must have at least two controllers, one to count the number of stations and the other to count the number of groups.

Both magnets are synchronously energized and deënergized by the alternating or intermittent current, causing the ratchet of the two controllers to be advanced by the same number of teeth. This continues till the ratchet of the controller on the traveling carriage "a" reaches zero point where it breaks the circuit at the brushes 18 and 19 by means of the insulating piece 17 as already described. The ratchet of "a" had U teeth to be advanced to reach zero point therefore the ratchet of "b" has been advanced U teeth, T teeth being still to be advanced to its zero point. The advancement of the ratchet of b does not take place until the setting is transferred a second time to a third carriage, whereupon the controller of the third carriage is advanced T teeth leaving the remaining U teeth to be counted off, as the stations of the new group are passed, as already described in the aforementioned Patent 1022935. If the carriage "b" now passes a third carriage "c" (Fig. 11) in which the operation is desired, and their controllers become connected in series with alternating or intermittent current, see Fig. 11, the current will pass through conductor 61 leading from the sourse of current supply to the winding of the magnet 9$^b$, conductors 49 and 50, brushes 51 and 52, conductor 53, the strip, the wiper 54, conductors 55 and 57, the winding of the magnet 9$^c$, conductors 58 and 59, brush 60, the strip, conductors 45 and 62 back to the source of supply again.

As before, the magnets will be energized and deënergized synchronously and the ratchets moved the same number of teeth:— T teeth, the circuit being broken at 51 and 52 when the ratchet of "b" reaches zero point in the manner already described. The ratchet of "c" now has U teeth still to be advanced before reaching zero point, which was the thing required to be done.

Instead of making the pawls 5 and 23 as shown in Figs. 1, 2, and 3, turning on a pin joint, we may make them in the form of a bent strip, as shown in Fig. 4. We do not however, desire to confine ourselves to the arrangement shown, that is to say, that the magnet be fixed and the armature moving, but we may, if desired, fix the armature and have the magnet moving as shown in Fig. 14. Again, we do not desire to limit ourselves to the particular form of electromagnets shown, but may use any well known form. Further, we do not desire to confine ourselves to the arrangement shown in which the pawl 5 is reciprocated by the action of a spring and a magnet but we may employ two magnets as shown in Fig. 15; in which case the armature 8 is attracted first to the pole of one magnet and then to the pole of the other magnet by energizing the magnets alternately, whereby the pawl 5 is given the desired reciprocating motion. Again, we may obtain the aforementioned result by making use of a known arrangement comprising a pair of bar magnets arranged upon a spindle and so disposed that they may be attracted or repelled from the pole of the electric magnet by reversing the direction of the exciting current.

Instead of the tapping key shown in Fig. 4 for setting the traveling controller, a switch such as shown in Figs. 5 and 6, may be used. The switch just referred to, consists of a base 81 carrying a piece 66 fixed to it. The said base may be made of slate or the like electric insulating material, or it may be of any suitable substance, care being taken to suitably insulate from one another those parts on it connected to the electric circuits. The said base also carries a suitable electric conductor 67 furnished with contacts 68. Fixed to the said base is an electromagnet 69 with its armature 70 carried on a pivot by the bracket 71, the said armature being fixed to the pawl 72 against which presses the spring 73. The piece 66 forms a bearing for the lever 74 carried by, and is securely fixed to, the shaft 75. The lever 74 is furnished with teeth 76 which are engaged by the said pawl, 72. The lever 74 is furnished with a handle 77 by which it may be manipulated, and with a brush 78 which makes a rubbing contact with the contacts 68. The lever 74 also has a pointer 79 moving over the graduated scale 80, the said scale being fixed to the base 81. The switch has three terminals for the reception of the electrical conductors, 82, 83 and 84. 82 is connected to one lead from the winding of the electromagnet 69. The other lead from 69 is connected to 83, which latter is also in electric connection with the brush 78, by means of 66, 75, 74, 85. The terminal 84 is connected to the contacts 68 by the conductors 65 and 67, and the screws shown. There is also a spring 86 fixed at one end to the lever 74 by the projection 87 and at the other to the base 81 by the projection 88. A fan 89 is carried on a pin 90 and driven from the shaft 75 by the gear wheels 91 and 92.

In addition to the operator's strips shown in Fig. 8 two others 93, 94 are provided, and the moving carriage "a" is provided with means 102 for connecting 94 electrically with 93, see Fig. 12. A switch 95 is provided whereby the apparatus may be rendered inoperative at will. The manner in which the switch is used is as follows:—To set the instrument the operator moves the lever 74 by means of the handle until the pointer 79 indicates by means of the scale 80 the number of stations the traveling carriage is required to pass before the desired operation is performed. The lever 74 is held in this position by the pawl 72 engaging with the teeth 76, Figs. 5 and 6. The said switch may be set at any time previous to the arrival of the moving carriage at the operator's strips. The operator, having set the lever 74 in the required position, then closes the switch 95, thus connecting the operator's strips 93 and 104 with the source of electric current, by means of the conductors 96, and 97, switch 95, and conductor 98.

When the traveling carriage comes into contact with the operator's strips a circuit is completed through the electromagnet 69 as shown clearly in Fig. 12 by conductor 100, terminal 83, winding of magnet 69, terminal 82, conductor 101, strip 94, piece 102, strip 93, conductors 96 and 97, switch 95, and conductor 98. The magnet 69 being thus excited attracts the armature 70, Figs. 5 and 6, and causes the pawl 72 to be lifted clear of the teeth 76 on the lever 74. The lever 74 is in this way set free to move under the action of the spring 86. The said spring 86 thus causes the lever to move back to the position from which the operator displaced it. In moving back, the brush 78 makes successive contacts with the contact points 68. In this manner the required number of impulses are transmitted to the magnet of the traveling controller as shown in the diagram Fig. 12, from the source of supply of current by conductor 100, terminal 83, piece 66, lever 74, brush 78, contacts 68, conductor 67, conductor 65, terminal 84, conductor 103, strip $104^1$, wiper $32^1$, conductors 32 and 31, winding of magnet, conductors 30 and 29, wiper 25, strip 104, conductors 97, switch 95, conductor 98, to the source of supply again. The number of contact points 68 will be one less than the number of teeth in the ratchet of the controller between zero points. If the scale 80 be graduated as shown in Fig. 6:—O, T, T—1, T—2, T— 3, . . . 3, 2 1 where T represents the total number of stations to be served, the operator will not be required to mentally calculate the setting to be given to the lever 74, but can set it directly by the scale. The fan 89 is provided to regulate the speed at which the brush 78 passes over the contacts 68.

We do not desire to confine ourselves to the use of a spring to return the lever 74 to its starting point, but may use any convenient means to effect this result. Nor do we desire to limit ourselves to the particular means shown for regulating the speed at which the brush 78 passes over the contacts 68, but may use any other convenient means for regulating it.

In the case where the operator sets a similar controller which is stationary, he advances its ratchet by as many teeth as the number of stations to be passed by the carriage before its ratchet reaches zero point, and this he may do by any convenient method. Thus, the ratchet may be furnished with a handle and pointer, or may be set by a pawl worked mechanically, or the operator may energize the magnet of his controller so many times by a key, as shown in the diagram, Fig. 13, or he may put a switch in a certain position and let it be moved by a spring so that it passes over so many contacts to make and break the circuit so many times. Thus referring to Fig. 13, the operator having connected the magnet of his stationary controller, $9^d$, with his switch 27 by means of the conductor 105, switch 106, and conductor 107, energizes the magnet the required number of times, the connections with the source of direct current supply being clearly shown in the said Fig. 13, conductor 108, switch 27, conductor 107, switch 106, conductor 105, winding of magnet $9^d$, conductors 109, 110. The operator's controller being thus set he connects conductors 111 and 105 by means of the said switch 106. When the carriage passes, the controller of which it is desired should be correspondingly set, the circuits of the electromagnets of both controllers are joined in series by means of the strips and wipers, and alternating or intermittent current is caused to flow in the circuit thus formed. This is clearly shown in Fig. 13. For alternating or intermittent current the circuit comprises the generator, conductors 112 and 109, winding of magnet $9^d$, conductor 105, switch 106, conductor 111, the strip, wiper 25, conductors 29 and 30, winding of magnet 9, conductors 31 and 32, wiper $32^1$, the strip, conductor 113, brush 114, brush 115, and conductor 116.

As described above both magnets will be synchronously energized and deënergized causing the ratchets of the two controllers to be advanced by the same number of teeth. This continues until the circuit is broken by the ratchet of the operator's controller reaching its zero point and causing the brushes 114 and 115 to separate in the manner hereinbefore described. The armatures of the controller magnets may be either solid or laminated.

Having now particularly described and ascertained the nature of our said invention, and in what manner the same is to be performed, we declare that what we claim is:—

1. Means for controlling the transfer of goods between two traveling bodies, or a fixed and traveling body, said means comprising a single member displaced according to the number of points at which a transfer might be effected and capable of being set by an operator from a point outside the said traveling body, such member having a step by step movement in one direction only, said member having means upon it whereby at the desired transferring point electrical circuits may be controlled for causing the operation of the mechanism of the respective bodies.

2. Means for controlling the transfer of goods between two traveling bodies, or a fixed and traveling body, said means comprising a rotary member displaced according to the number of points at which a transfer might be effected and capable of being set by an operator from a point outside the said traveling body, such member having a step by step movement in one direction only, said member having means upon it whereby at the desired transferring point electrical circuits may be controlled for causing the operation of the mechanism of the respective bodies.

3. Means for controlling the transfer of goods between two traveling bodies, or a fixed and traveling body, said means comprising a single member displaced according to the number of points at which a transfer might be effected and capable of being set by an operator from a point outside the said traveling body, such member having a step by step movement in one direction only, said member having means upon it whereby at the desired transferring point electrical circuits may be controlled for causing the operation of the mechanism of the respective bodies and means for checking the further movement of the member until a further setting is imparted thereto.

4. Means for controlling the transfer of goods between two traveling bodies, or a fixed and traveling body, said means comprising a single rotary member displaced according to the number of points at which a transfer might be effected and capable of being set by an operator from a point outside the said traveling body, such rotary member having a step by step movement in one direction only, said member having means upon it whereby at the desired transferring point electrical circuits may be controlled for causing the operation of the mechanism of the respective bodies and means for checking the further movement of the member until a further setting is imparted thereto.

5. Means for controlling the transfer of goods between two traveling bodies, or a fixed and traveling body, said means comprising a single member displaced according to the number of points at which a transfer might be effected and capable of being set by an operator from a point outside the said traveling body, a ratchet associated with said member, a pawl engaging said ratchet whereby a step by step motion in one direction is imparted to said member and means for operating said pawl, means upon the member whereby at the desired transferring point electrical circuits may be controlled for causing the operation of the mechanism of the respective bodies.

6. Means for controlling the transfer of goods between two traveling bodies, or a fixed and traveling body, said means comprising a single rotary member displaced according to the number of points at which a transfer might be effected and capable of being set by an operator from a point outside the said traveling body, a ratchet associated with said single rotary member, a pawl engaging said ratchet whereby a step by step motion in one direction is imparted to said rotary member and means for operating said pawl, means upon the rotary member whereby at the desired transferring point electrical circuits may be controlled for causing the operation of the mechanism of the respective bodies.

7. Means for controlling the transfer of goods between two traveling bodies, or a fixed and traveling body, said means comprising a single member displaced according to the number of points at which a transfer might be effected and capable of being set by an operator from a point outside the said traveling body, a ratchet associated with said single member, a pawl engaging said ratchet whereby a step by step motion in one direction is imparted to said member and means for operating said pawl, means upon the member whereby at the desired transferring point electrical circuits may be controlled for causing the operation of the mechanism of the respective bodies and means for preventing the further movement of the member until a further setting is imparted thereto.

8. Means for controlling the transfer of goods between two traveling bodies, or a fixed and traveling body, said means comprising a single rotary member displaced according to the number of points at which a transfer might be effected and capable of being set by an operator from a point outside the said traveling body, a ratchet associated with said member, a pawl engaging said ratchet whereby a step by step motion in one direction is imparted to said rotary member and means for operating said pawl, means upon the rotary member whereby at the desired transferring point electrical circuits may be controlled for causing the operation of the mechanism of the respective bodies and means for checking the further movement of the rotary member until a further setting is imparted thereto.

9. Means for controlling the transfer of goods between two traveling bodies or a fixed and traveling body comprising a single body rotating in one direction only, and having conductors thereon, a ratchet operatively associated with said body, a pawl operating said ratchet, said pawl being moved in one direction by an armature attracted by an electro-magnet, and in the other direction by means of a spring, said body at a predetermined portion of its rotation closing an electric circuit whereby the transfer is effected, means for causing a predetermined displacement of the aforesaid body from the effective position at the will of the operator, and means for varying such displacement when and because a certain number of transferring points have been passed by the traveling body since such setting by the operator.

10. Means for controlling the transfer of goods between two traveling bodies or a fixed and traveling body comprising a single body rotating in one direction only, and having conductors thereon, a ratchet operatively associated with said body, a pawl operating said ratchet, an electro-magnet and armature thereof and a spring opposed thereto operating said pawl and means for energizing and deënergizing said electromagnet, said body at a predetermined portion of its rotation closing an electric circuit whereby the transfer is effected, means for causing a predetermined displacement of the aforesaid body from the effective position at the will of an operator, and means for varying such displacement when and because a certain number of transferring points have been passed by the traveling body since such setting by the operator.

11. Means for controlling the transfer of goods between two traveling bodies or a fixed and traveling body, comprising a single body rotating in one direction only and having conductors thereon, a ratchet operatively associated with said body, a pawl operating such ratchet, said pawl being moved in one direction by an armature attracted by an electro-magnet, and in the other by means of a spring, contacts arranged in the path of the conductors on the body whereby an electric circuit is closed when the rotating body is in a predetermined position and the transfer effected, means for causing a predetermined displacement of the aforesaid body from the effective position at the will of an operator, and means for varying such displacement when and because a certain number of transferring points have been passed by the traveling body since such setting by the operator.

12. Means for controlling the transfer of goods between two traveling bodies or a fixed and traveling body, comprising a single body rotating in one direction only and having conductors thereon, a ratchet operatively associated with said body, a pawl operating said ratchet, an electro-magnet and armature thereof and a spring opposed thereto operating said pawl and means for energizing and deënergizing said electromagnet, contacts arranged in the path of the conductors on the body whereby an electric circuit is closed when the rotating body is in a predetermined position, and the transfer effected, means for causing a predetermined displacement of the aforesaid body from the effective position at the will of an operator, and means for varying such displacement when and because a certain number of transferring points have been passed by the traveling body since such setting by the operator.

13. Means for controlling the transfer of goods between two traveling bodies or a fixed and a traveling body, comprising a single body rotating in one direction only and having conductors thereon, a ratchet geared to said body, a pawl operating said ratchet, said pawl being moved in one direction by an armature attracted by an electro-magnet, and in the other by means of a spring, contacts arranged in the path of the conductors on the body whereby an electric circuit is closed when the rotating body is in a predetermined position, and the transfer effected, means for causing a predetermined displacement of the aforesaid body from the effective position at the will of an operator, and means for varying such displacement when and because a certain number of transferring points have been passed by the traveling body since such setting by the operator.

14. Means for controlling the transfer of goods between two traveling bodies or a fixed and traveling body, comprising a single body rotating in one direction only and having conductors thereon, a ratchet geared to said body, a pawl operating said ratchet, an electro-magnet and armature thereof and a spring opposed thereto operating said pawl and means for energizing and deënergizing said electro-magnet, contacts arranged in the path of the conductors on the body whereby an electric circuit is closed when the rotating body is in a predetermined position, and the transfer effected, means for causing a predetermined displacement of the aforesaid body from the effective position at the will of an operator, and means for varying such displacement when and because a certain number of transferring points have been passed by the traveling body since such setting by the operator.

15. Means for controlling the transfer of goods between two traveling bodies or a fixed and traveling body, comprising a single body rotating in one direction only and having conductors thereon, a ratchet fixed to said body, a pawl operating such ratchet, said pawl being moved in one direction by an armature attracted by an electro-magnet, and in the other by means of a spring, contacts arranged in the path of the conductors on the body whereby an electric circuit is closed when the rotating body is in a predetermined position, and the transfer effected, means for causing a predetermined displacement of the aforesaid body from the effective position at the will of an operator, and means for varying such displacement when and because a certain number of transferring points have been passed by the traveling body since such setting by the operator.

16. Means for controlling the transfer of goods between two traveling bodies or a fixed and traveling body, comprising a single body rotating in one direction only and having conductors thereon, a ratchet fixed to said body, a pawl operating said ratchet, an electro-magnet and armature thereof and a spring opposed thereto operating said pawl and means for energizing and deënergizing said electro-magnet, contacts arranged in the path of the conductors on the body whereby an electric circuit is closed when the rotating body is in a predetermined position, and the transfer effected, means for causing a predetermined displacement of the aforesaid body from the effective position at the will of an operator, and means for varying such displacement when and because a certain number of transferring points have been passed by the traveling body since such setting by the operator.

17. Means for controlling the transfer of goods between two traveling bodies, or a fixed and traveling body, said means comprising a single member displaced according to the number of points at which a transfer might be effected and capable of being set by an operator from a point outside the said traveling body, such member having a step by step movement in one direction only, said member having means upon it whereby at the desired transferring point electrical circuits may be controlled for causing the operation of the mechanism of the respective bodies, means for causing a predetermined displacement of the aforesaid body from the effective position at the will of an operator embodying a number of contacts, said contacts being one less in number than the steps necessary to move the switch member of the controller from one zero point to another, a movable member having means contacting with the aforesaid contacts whereby the ratchet gear will receive a number of impulses equal to the number of contacts made by the movable member, a scale having indications thereon, which, when the movable contact bearing member is set, shows the number of contacts through which no circuits have been completed.

18. Means for controlling the transfer of goods between two traveling bodies, or a fixed and traveling body, said means comprising a single rotary member displaced according to the number of points at which a transfer might be effected and capable of being set by an operator from a point outside the said traveling body, such member having a step by step movement in one direction only, said member having means upon it whereby at the desired transferring point electrical circuits may be controlled for causing the operation of the mechanism of the respective bodies, means for causing a predetermined displacement of the aforesaid body from the effective position at the will of an operator embodying a number of contacts, said contacts being one less in number than the steps necessary to move the rotary switch member of the controller from one zero point to another, a movable member having means contacting with the aforesaid contacts whereby the ratchet gear will receive a number of impulses equal to the number of contacts made by the movable member, a scale having indications thereon, which, when the movable contact bearing member is set, shows the number of contacts through which no circuits have been completed.

19. Means for controlling the transfer of goods between two traveling bodies, or a fixed and traveling body, said means comprising a single member displaced according to the number of points at which a transfer might be effected and capable of being set by an operator from a point outside the said traveling body, such member having a step by step movement in one direction only, said member having means upon it whereby at the desired transferring point electrical circuits may be controlled for causing the operation of the mechanism of the respective bodies and means for checking the further movement of the member until a further setting is imparted thereto, means for causing a predetermined displacement of the aforesaid body from the effective position at the will of an operator embodying a number of contacts, said contacts being one less in number than the steps necessary to move the switch member of the controller from one zero point to another, a movable member having means contacting with the aforesaid contacts whereby the ratchet gear will receive a number of impulses equal to the number of contacts made by the movable member, a scale having indications thereon, which, when the movable contact bearing member is set, shows the number of contacts through which no circuits have been completed.

20. Means for controlling the transfer of goods between two traveling bodies, or a fixed and traveling body, said means comprising a single rotary member displaced according to the number of points at which a transfer might be effected and capable of being set by an operator from a point outside the said traveling body, such rotary member having a step by step movement in one direction only, said member having means upon it whereby at the desired transferring point electrical circuits may be controlled for causing the operation of the mechanism of the respective bodies and means for checking the further movement of the member until a further setting is imparted thereto, means for causing a predetermined displacement of the aforesaid body from the effective position at the will of an operator embodying a number of contacts, said contacts being one less in number than the steps necessary to move the rotary switch member of the controller from one zero point to another, a movable member having means contacting with the aforesaid contacts whereby the ratchet gear will receive a number of impulses equal to the number of contacts made by the movable member, a scale having indications thereon, which, when the movable contact bearing member is set, shows the number of contacts through which no circuits have been completed.

21. Means for controlling the transfer of goods between two traveling bodies, or a fixed and traveling body, said means comprising a single member displaced according to the number of points at which a transfer might be effected and capable of being set by an operator from a point outside the said traveling body, such single member having a step by step movement in one direction only, said member having means upon it whereby at the desired transferring point electrical circuits may be controlled for causing the operation of the mechanism of the respective bodies, means for causing a predetermined displacement of the aforesaid body from the effective position at the will of an operator embodying a number of contacts, said contacts being one less in number than the steps necessary to move the switch member of the controller from one zero point to another, a movable member having means for contacting with the aforesaid contacts whereby the ratchet gear will receive a number of impulses equal to the number of contacts made by the movable member, a scale having indications thereon, which, when the movable contact bearing member is set, shows the number of contacts made and consequently the number of impulses imparted to the electro-magnetic ratchet gear of the member of the controller.

22. Means for controlling the transfer of goods between two traveling bodies, or a fixed and traveling body, said means comprising a single rotary member displaced according to the number of points at which a transfer might be effected and capable of being set by an operator from a point outside the said traveling body, such rotary member having a step by step movement in one direction only, said member having means upon it whereby at the desired transferring point electrical circuits may be controlled for causing the operation of the mechanism of the respective bodies, means for causing a predetermined displacement of the aforesaid body from the effective position at the will of an operator embodying a number of contacts, said contacts being one less in number than the steps necessary to move the rotary switch member of the controller from one zero point to another, a movable member having means for contacting with the aforesaid contacts whereby the ratchet gear will receive a number of impulses equal to the number of contacts made by the movable member, a scale having indications thereon, which, when the movable contact bearing member is set, shows the number of contacts made and consequently the number of impulses imparted to the electric magnetic ratchet gear of the rotary member of the controller.

23. Means for controlling the transfer of goods between two traveling bodies, or a fixed and traveling body, said means comprising a single member displaced according to the number of points at which a transfer might be effected and capable of being set by an operator from a point outside the said traveling body, such single member having a step by step movement in one direction only, said member having means upon it whereby at the desired transferring point electrical circuits may be controlled for causing the operation of the mechanism of the respective bodies and means for checking the further movement of the member until a further setting is imparted thereto, means for causing a predetermined displacement of the aforesaid body from the effective position at the will of an operator embodying a number of contacts, said contacts being one less in number than the steps necessary to move the switch member of the controller from one zero point to another, a movable member having means for contacting with the aforesaid contacts whereby the ratchet gear will receive a number of impulses equal to the number of contacts made by the movable member, a scale having indications thereon, which, when the movable contact bearing member is set, shows the number of contacts made and consequently the number of impulses imparted to the electro-magnetic ratchet gear of the member of the controller.

24. Means for controlling the transfer of goods between two traveling bodies, or a fixed and traveling body, said means comprising a single rotary member displaced according to the number of points at which a transfer might be effected and capable of being set by an operator from a point outside the said traveling body, such rotary member having a step by step movement in one direction only, said member having means upon it whereby at the desired transferring point electrical circuits may be controlled for causing the operation of the mechanism of the respective bodies and means for checking the further movement of the member until a further setting is imparted thereto, means for causing a predetermined displacement of the aforesaid body from the effective position at the will of an operator embodying a number of contacts, said contacts being one less in number than the steps necessary to move the rotary switch member of the controller from one zero point to another, a movable member having means for contacting with the aforesaid contacts whereby the ratchet gear will receive a number of impulses equal to the number of contacts made by the movable member, a scale having indications thereon, which, when the movable contact bearing member is set, shows the number of contacts made and consequently the number of impulses imparted to the electro-magnetic ratchet gear of the rotary member of the controller.

25. Means for controlling the transfer and receipt of goods between two traveling bodies or a fixed and traveling body comprising a body rotating in one direction only, having insulating bodies thereon, and conducting bodies, a ratchet operatively associated with said body, a pawl operating said ratchet, said pawl being carried by an armature operated in one direction by an electro-magnet, and in the other by means of a spring, open contacts arranged in the path of the conductors on the body, closed contacts arranged in the path of the non conductors on the body contact between said open contacts serving to effect the desired operation while the separation of the closed contacts by the insulating rotating body serves to break a circuit when the body is in the zero position, means for causing a predetermined displacement of the aforesaid body from the effective position at the will of an operator, and means for varying such displacement when and because a certain number of transferring points have been passed by the traveling body since such setting by the operator.

26. Means for controlling the transfer and receipt of goods between two traveling bodies or a fixed and traveling body comprising a rotating body, having insulating bodies thereon and conducting bodies, a ratchet operatively associated with said body, a pawl operating said ratchet, said pawl being carried by an armature operated in one direction by an electro-magnet, and in the other by means of a spring, means for preventing the overthrow of the ratchet, open contacts arranged in the path of the conductors on the body, closed contacts arranged in the path of the non-conductors on the body, contacts between said open contacts serving to effect the desired operation while the separation of the closed contacts by the insulating body serves to break a circuit when the rotating body is in the zero position, means for causing a predetermined displacement of the aforesaid rotating body from the effective position at the will of an operator, and means for varying such displacement when and because a certain number of transferring points have been passed by the traveling body since such setting by the operator.

27. Means for controlling the transfer and receipt of goods between two traveling bodies or a fixed and traveling body comprising a base having supports for a spindle, a body upon said spindle, a ratchet operatively associated with said body, an electromagnet mounted upon said base, an armature pivotally mounted upon said base, a pawl upon said armature engaging said ratchet, a spring acting upon the armature to oppose the pull of the magnet, means for regulating the effort of said spring, a check pawl for preventing the overthrow of the ratchet wheel, a stop for the pawl, said stop operating to lock said pawl into the teeth of the ratchet upon the completion of its effective travel, conductors and non conducting bodies on the rotating body, contacts arranged in the path of said conductors, and non conductors whereby one electric circuit is closed for effecting the desired operation, and another opened to prevent the further setting of the controller, when the rotating body is in a predetermined position, means for causing a predetermined displacement of the aforesaid rotating body from the effective position at the will of an operator, and means for varying such displacement when and because a certain number of transferring points have been passed by the traveling body since such setting by the operator.

28. Means for controlling the transfer and receipt of goods between two traveling bodies or a fixed and traveling body comprising a member constrained to move in a definite path upon said carriage, and capable of actuating means to effect the desired operation when in one position in that path, means for causing a predetermined displacement of the aforesaid member from the effective position at the will of an operator, embodying a movable arm, a spring acting upon said arm, means for holding said arm against the action of said spring, contacts arranged in the path of said arm, and a wiper upon said arm designed to pass over the contacts when said arm is released and complete a circuit embodying means operatively associated with the member constrained to move in a definite path, and means for varying the displacement of the said member when and because a certain number of transferring points have been passed by the traveling body since the setting by the operator.

29. Means for controlling the transfer and receipt of goods between two traveling bodies or a fixed and traveling body comprising a member constrained to move in a definite path upon said moving body, and capable of actuating means to effect the desired operation when in one position in that path, means for causing a predetermined displacement of the aforesaid member from the effective position at the will of an operator, embodying a movable arm, a spring acting upon said arm, means for holding said arm against the action of said spring, contacts arranged in the path of said arm, and a wiper upon said arm designed to pass over the contacts when said arm is released and complete a circuit embodying an electro-magnet operatively associated with the member constrained to move in a definite path, and means for varying the displacement of the body when and because a certain number of transferring points have been passed by the traveling body since the setting by the operator.

30. Means for controlling the transfer and receipt of goods between two traveling bodies or a fixed and traveling body comprising a member constrained to move in a definite path upon said carriage, and capable of actuating means to effect the desired operation when in one position in that path, means for causing a predetermined displacement of the aforesaid member from the effective position at the will of the operator, embodying a pivotally mounted arm, a spring acting upon said arm to return it to its starting point, magnetically actuated means for holding said arm against the action of said spring, contacts arranged in the path of said arm, and a wiper upon said arm designed to pass over the contacts when said arm is released and complete a circuit embodying means operatively associated with the member constrained to move in a definite path, and means for varying the displacement of the member when and because a certain number of transferring points have been passed by the traveling body since the setting by the operator.

31. Means for controlling the transfer and receipt of goods between two traveling bodies or a fixed and traveling body comprising a member constrained to move in a definite path upon said traveling body, and capable of actuating means to effect the desired operation when in one position in that path, means for causing a predetermined displacement of the aforesaid body from the effective position at the will of an operator, embodying a pivotally mounted arm, a spring acting upon said arm to return it to its starting point, an electro-magnet, an armature, a ratchet upon the arm engaged by said armature whereby the arm is held against the action of the spring, contacts arranged in the path of said arm, and a wiper upon said arm designed to pass over the contacts when said arm is released and complete a circuit embodying an electro-magnet operatively associated with a member constrained to move in a definite path, and means for varying the displacement of the member when and because a certain number of transferring points have been passed by the traveling body since the setting by the operator.

32. Means for controlling the transfer and receipt of goods between two traveling bodies or a fixed and traveling body comprising a member constrained to move in a definite path upon said carriage, and capable of actuating means to effect the desired operation when in one position in that path, means for causing a predetermined displacement of the aforesaid body from the effective position at the will of an operator, embodying a pivotally mounted arm, a spring acting upon said arm to return it to its starting point, an electro-magnet, an armature, a ratchet upon the arm engaged by said armature whereby the arm is held against the action of the spring, means to retard the movement of the arm, contacts arranged in the path of said arm, and a wiper upon said arm designed to pass over the contacts when said arm is released and complete a circuit embodying an electro-magnet operatively associated with, the member constrained to move in a definite path, and means for varying the displacement of the member when and because a certain number of transferring points have been passed by the traveling body since the setting by the operator.

33. Means for controlling the transfer and receipt of goods between two traveling bodies or a fixed and traveling body comprising a member constrained to move in a definite path upon said carriage, and capable of actuating means to effect the desired operation when in one position in that path, means for causing a predetermined displacement of the aforesaid body from the effective position at the will of an operator, embodying a pivotally mounted arm, a spring acting upon said arm to return it to its starting point, an electro-magnet, an armature, a ratchet upon the arm engaged by said armature whereby the arm is held against the action of the spring, means to retard the movement of the arm comprising a gear wheel mounted upon the pivot of the arm, a second gear wheel in engagement therewith, said second wheel being mounted upon a sleeve carrying a fan, a pin for the support of said sleeve, contacts arranged in the path of said arm, and a wiper upon said arm designed to pass over the contacts when said arm is released and complete a circuit embodying an electro-magnet operatively associated with the member constrained to move in a definite path, and means for varying the displacement of the member when and because a certain number of transferring points have been passed by the traveling body since the setting by the operator.

34. Means for controlling the transfer and receipt of goods between two traveling bodies or a fixed and traveling body comprising a member constrained to move in a definite path upon said carriage, and capable of actuating means to effect the desired operation when in one position in that path, means for causing a predetermined displacement of the aforesaid body from the effective position at the will of the operator, embodying a pivotally mounted arm, a spring acting upon said arm to return it to its starting point, magnetically actuated means for holding said arm against the action of said spring, contacts arranged in the path of said arm, a pointer upon said arm and a scale indicating the number of stations equivalent to the contacts, and a wiper upon said arm designed to pass over the contacts when said arm is released and complete a circuit embodying means operatively associated with the member constrained to move in a definite path, and means for varying the displacement of the member when and because a certain number of transferring points have been passed by the traveling body since the setting by the operator.

35. Means for controlling the transfer and receipt of goods between two traveling bodies or a fixed and traveling body comprising a member constrained to move in a definite path, conducting and non conducting bodies carried by said member, open contacts, and closed contacts, said open contacts forming part of a circuit including means for effecting the desired operation and being adapted to be closed when the member is in a predetermined position, said closed contact including a magnet for effecting the operation of the member, and adapted to be opened when the member reaches a predetermined position, means for causing a predetermined displacement of the aforesaid member at the will of an operator, and means for varying said displacement when and because a certain number of transferring points have been passed by the traveling body since the setting by the operator.

36. Means for controlling the transfer and receipt of goods between two traveling bodies or a fixed and traveling body comprising a revolubly mounted body, conducting and non conducting bodies carried by said member, open contacts, and closed contacts, said open contacts forming part of a circuit including means for effecting the desired operation and being adapted to be closed when the member is in a predetermined position, said closed contact including a magnet for effecting the operation of the member, and adapted to be opened when the member reaches a predetermined position, means for causing a predetermined displacement of the aforesaid member at the will of an operator, and means for varying said displacement when and because a certain number of transferring points have been passed by the traveling body since the setting by the operator.

37. Means for controlling the transfer and receipt of goods between two traveling bodies or a fixed and traveling body comprising a revolubly mounted body, conducting and non conducting bodies carried by said member, open contacts, and closed contacts, said open contacts forming part of a circuit including means for effecting the desired operation and being adapted to be closed when the member is in a predetermined position, said closed contact including a magnet for effecting the operation of the member, and adapted to be opened when the member reaches a predetermined position, means for causing a predetermined displacement of the aforesaid member at the will of an operator, and comprising a key included in the circuit of the operating means for the revoluble body, and means for varying said displacement when and because a certain number of transferring points have been passed by the traveling body since the setting by the operator.

38. Means for controlling the transfer and receipt of goods between two traveling bodies or a fixed and traveling body comprising a revolubly mounted body, conducting and non conducting bodies carried by said member, open contacts, and closed contacts, said open contacts forming part of a circuit including means for effecting the desired operation and being adapted to be closed when the member is in a predetermined position, said closed contact including a magnet for effecting the operation of the member, and adapted to be opened when the member reaches a predetermined position, means for causing a predetermined displacement of the aforesaid member at the will of an operator, and comprising a switch having a displaceable arm and a number of contacts equal in number to the stations, said arm and said contacts being included in the circuit of the operating magnet for the revoluble body, and means for varying said displacement when and because a certain number of transferring points have been passed by the traveling body since the setting by the operator.

39. Means for controlling the transfer and receipt of goods between two traveling bodies or a fixed and traveling body comprising a revolubly mounted member, conducting and non conducting bodies carried by said member, open contacts, and closed contacts, said open contacts forming part of a circuit including means for effecting the desired operation and being adapted to be closed when the member is in a predetermined position, said closed contact circuit including a magnet for effecting the operation of the member, means for causing a predetermined displacement of the aforesaid member at the will of an operator, and comprising a switch having a displaceable arm, and a number of contacts equal in number to the number of transferring points, said arm and said contacts being included in the circuit of the operating magnet for the revoluble body, and means for varying said displacement when and because a certain number of transferring points have been passed by said body, comprising circuit closing means upon the traveling body whereby the operating magnet for the revoluble body is energized as the carriage passes the desired points.

Signed in the presence of the two undersigned witnesses.

ALFRED WARWICK GATTIE.
HENRY ASHLEY COX.

Witnesses:
MABEL HARRIS,
JAMES CULVERWELL.